Figure 1:
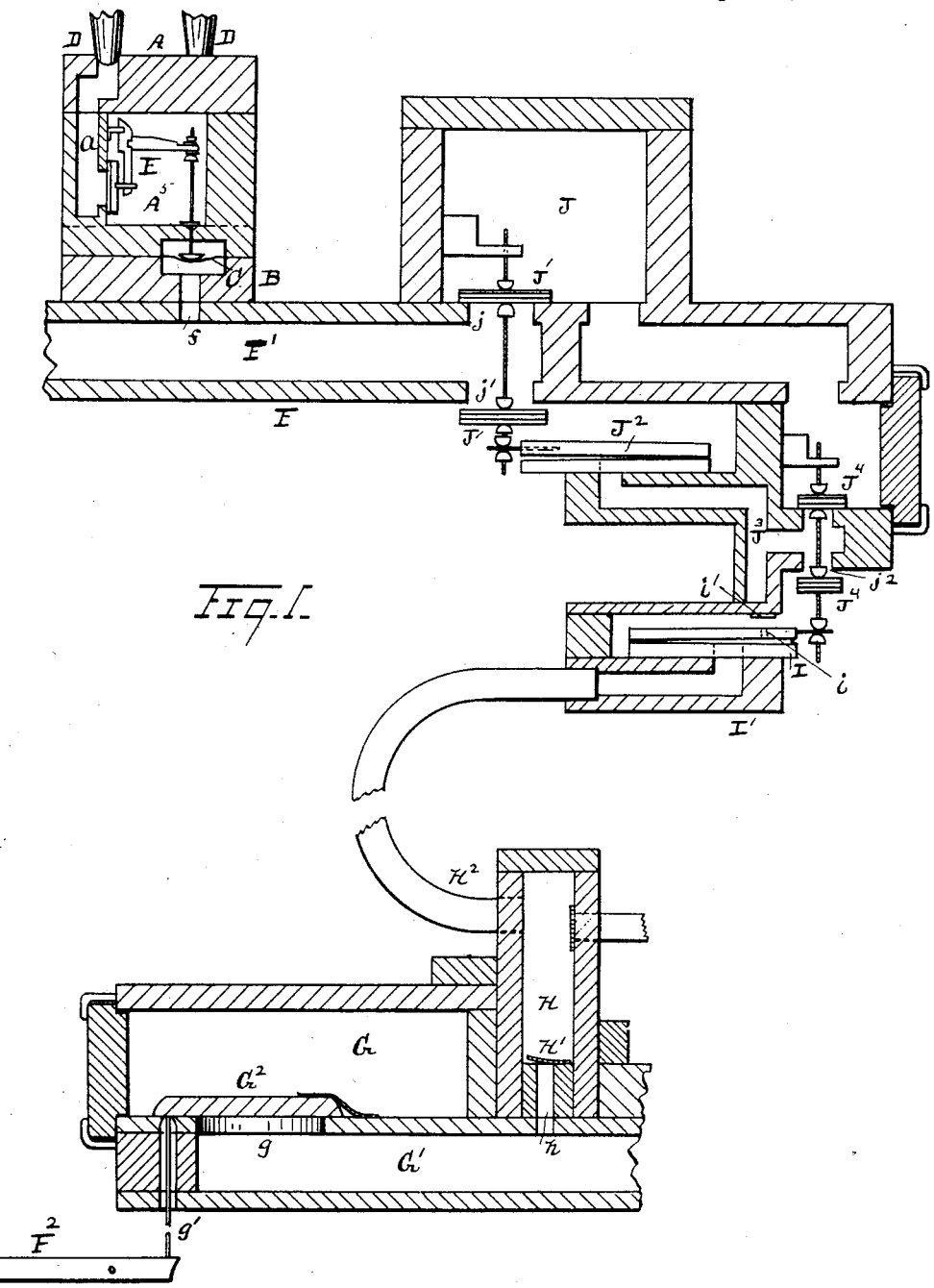

(No Model.) 4 Sheets—Sheet 1.

E. S. VOTEY & W. D. WOOD.
WIND CHEST FOR PIPE ORGANS.

No. 475,831. Patented May 31, 1892.

Witnesses
John Schuman
John F. Miller.

Inventors
Edwin S. Votey
William D. Wood
By their Attorney
Newell S. Wright.

(No Model.) 4 Sheets—Sheet 2.
E. S. VOTEY & W. D. WOOD.
WIND CHEST FOR PIPE ORGANS.
No. 475,831. Patented May 31, 1892.
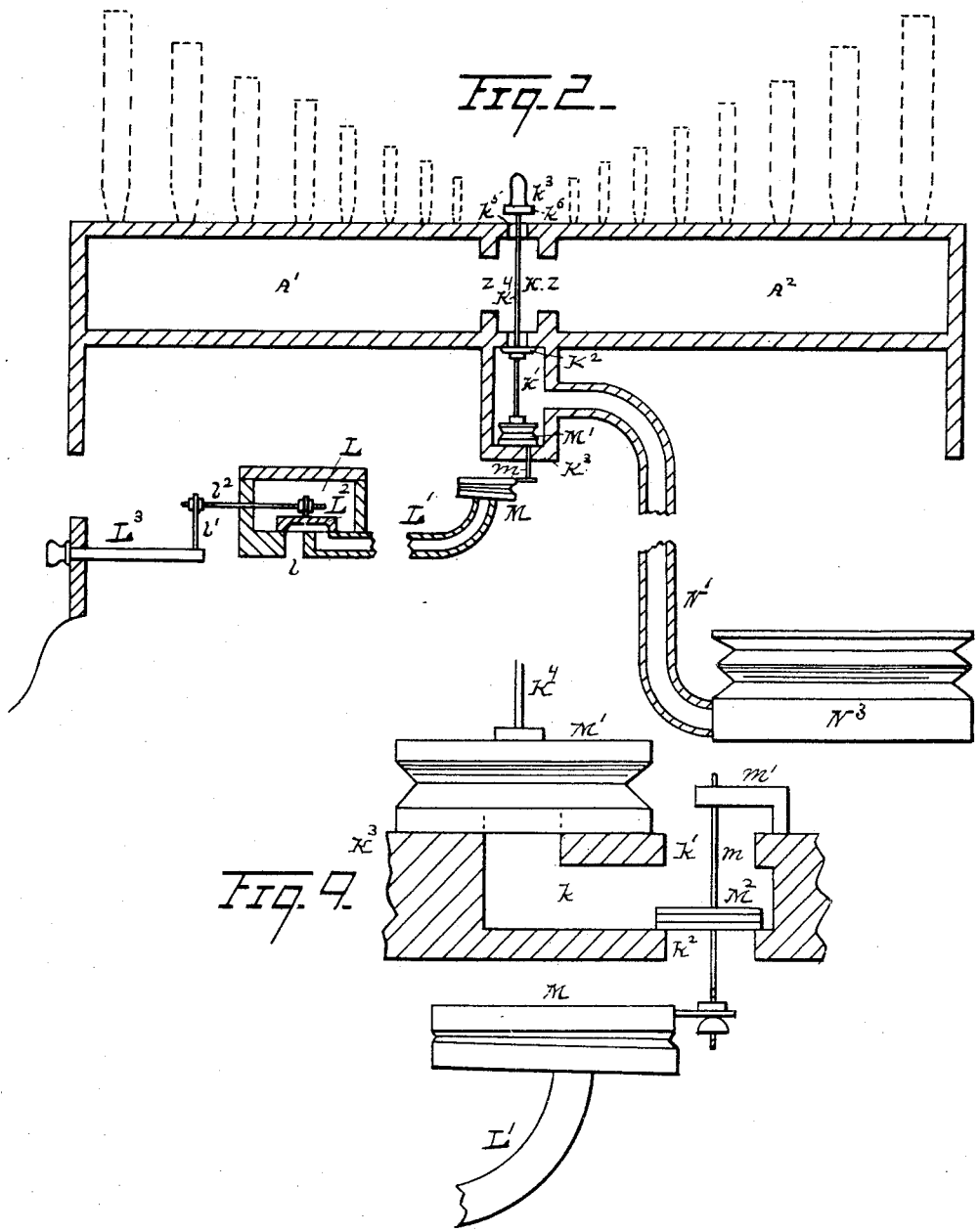

(No Model.) 4 Sheets—Sheet 3.
E. S. VOTEY & W. D. WOOD.
WIND CHEST FOR PIPE ORGANS.
No. 475,831. Patented May 31, 1892.
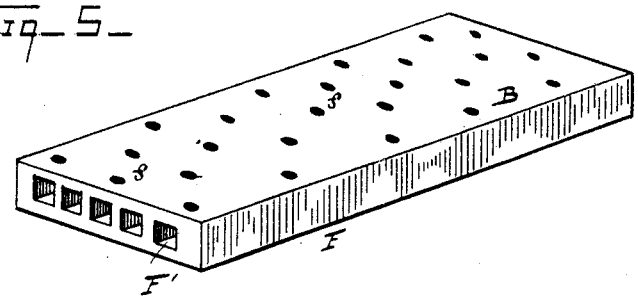
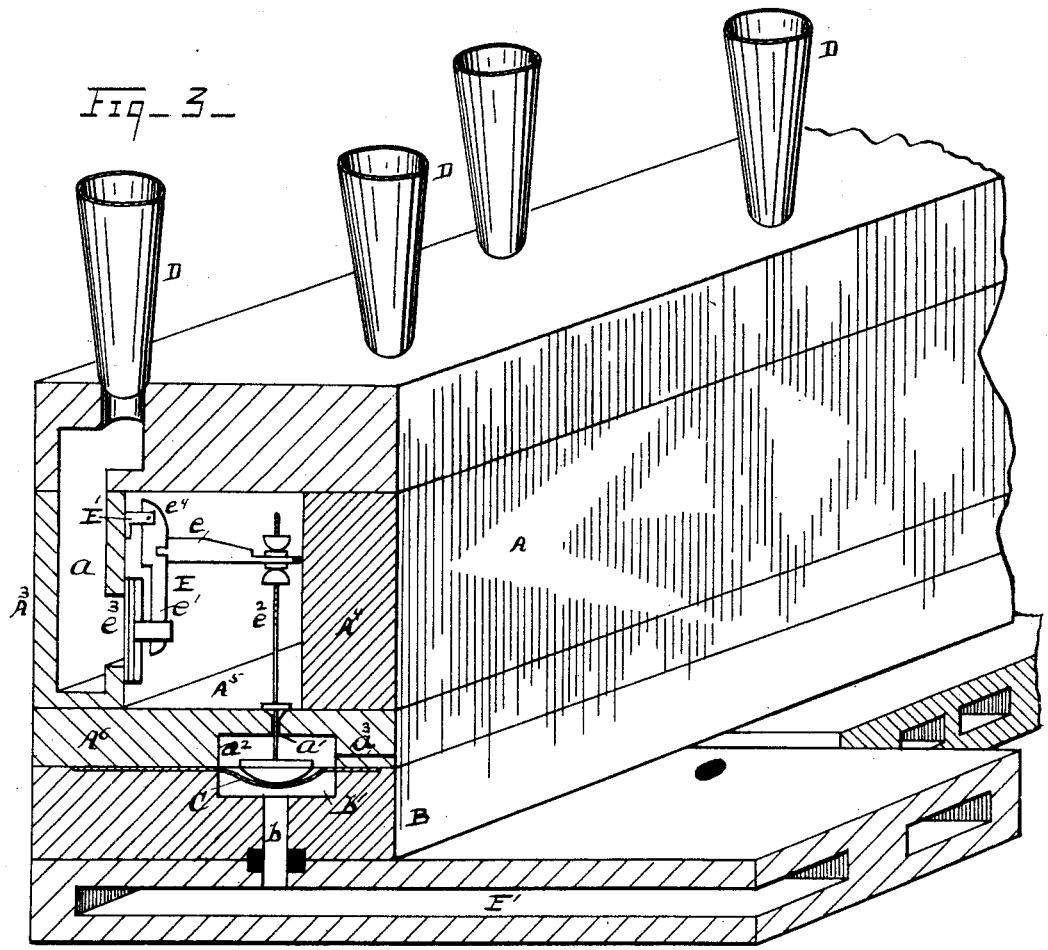

(No Model.) 4 Sheets—Sheet 4.
E. S. VOTEY & W. D. WOOD.
WIND CHEST FOR PIPE ORGANS.
No. 475,831. Patented May 31, 1892.
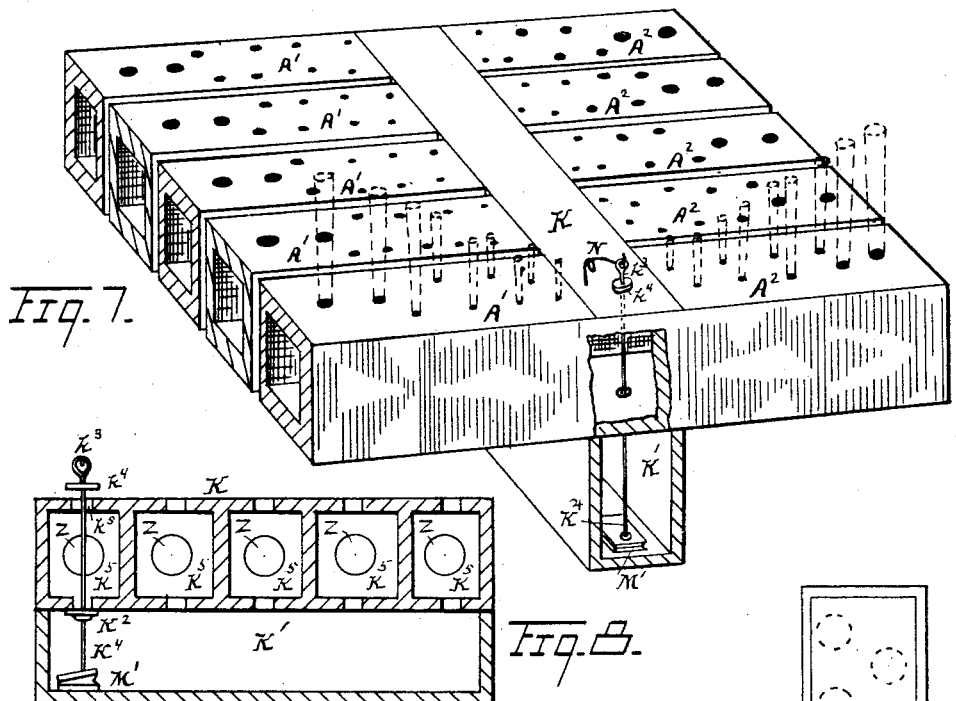
Fig. 7.
Fig. 8.
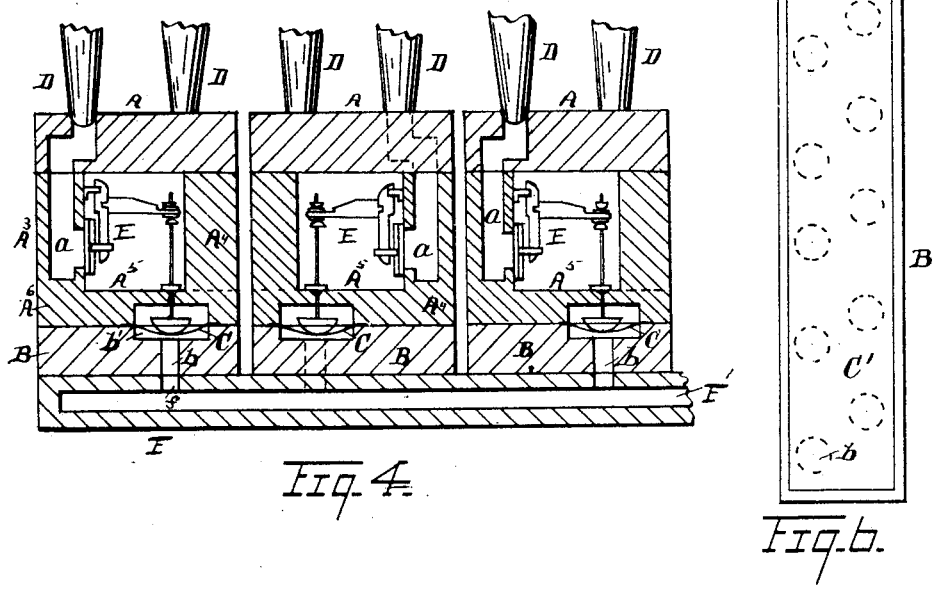
Fig. 4.
Fig. 6.
Witnesses
John Schuman.
John F. Miller.
Inventors
Edwin S. Votey
William D. Wood
By their Attorney
Newell S. Wright

UNITED STATES PATENT OFFICE.

EDWIN S. VOTEY AND WILLIAM D. WOOD, OF DETROIT, MICHIGAN.

WIND-CHEST FOR PIPE-ORGANS.

SPECIFICATION forming part of Letters Patent No. 475,831, dated May 31, 1892.

Application filed July 20, 1891. Serial No. 400,137. (No model.)

*To all whom it may concern:*

Be it known that we, EDWIN S. VOTEY and WILLIAM D. WOOD, citizens of the United States, residing at Detroit, county of Wayne, State of Michigan, have invented a certain new and useful Improvement in Wind-Chests for Pipe-Organs; and we declare the following to be a full, clear, and exact description of the invention, such as will enable others skilled in the art to which it appertains to make and use the same, reference being had to the accompanying drawings, which form a part of this specification.

Our invention relates to certain new and useful improvements in the construction and arrangement of wind-chests for pipe-organs.

Heretofore in certain styles of organs it has been customary to employ a single wind-chest common to all or several sets of pipes, a set of pipes consisting of those corresponding to or controlled by any particular stop. With this construction and arrangement the larger pipes, it is well known, take more than their proportionate share of the wind in the common wind-chest, thereby to that extent tending to rob the smaller pipes of their requisite quantity of wind. It is well understood, also, that in tuning pipe-organs the pipes are all tuned under the assumption that they will each have their proper and normal quantity of wind when brought into action. This it can have with the single wind-chest as above constructed and arranged when the corresponding stop alone is pulled. When several stops are pulled, causing the corresponding sets of pipes to be sounded simultaneously, then the robbing action above referred to gives to the larger pipes more than their share of air and subtracts from the smaller pipes the air sufficient to give them their requisite amount, resulting, obviously, in an abnormal and disordered action both of the larger and the smaller pipes, neither sounding normally in exact tune.

The object of our invention consists, first, in constructing the wind-chest for a single set of pipes in sections, the chest being preferably made in two halves, each half or section supplying wind for a half set of pipes, one half being located to the right and the other to the left, thereby permitting the larger pipes to be located toward the outside on either hand, diminishing in size toward the center; secondly, our invention consists in the combination, with independent wind-chests corresponding to the separate stops and sets of pipes, as above stated, of individual valves and pneumatics in each wind-chest operating the individual valves, respectively, and corresponding to and governing the different pipes, and communicating air-channels connecting the pneumatic of any key on the manual with the pneumatic of the corresponding tubes of the several wind-chests in connection; thirdly, our invention consists in novel features in the construction of the pneumatics and valves in connection with said wind-chests, and our invention, furthermore, relates, fourthly, to the general construction, combination, and arrangement of devices and appliances hereinafter specified, claimed, and illustrated, in which—

Figure 1 is a sectional view in diagram showing features of our invention. Fig. 2 is a similar view illustrating other features of our invention. Fig. 3 is a view in section and perspective showing a wind-chest and its arrangement upon the channel-boards. Fig. 4 is a vertical section showing a series of wind-chests engaged upon a channel-board. Fig. 5 is a separate view of a channel-board. Fig. 6 is a separate view of the base of the wind-chest, provided with a series of pouch pneumatics. Fig. 7 is a view in section and perspective showing the arrangement and construction of a series of wind-chests made in sections, the base and channel-boards being omitted. Fig. 8 is a vertical cross-section through the stop-box. Fig. 9 is a sectional view showing in detail the construction and operation of the pneumatics for opening the valves admitting the air-supply to the wind-chests.

We carry out our invention as follows:

A represents an independent wind-chest for supplying wind to a set of pipes corresponding to a single stop, preferably made in two sections A' A², as shown in Figs. 2 and 7. B is the base thereof, constructed with a series of orifices $b$, which are preferably enlarged at the top, as shown at $b'$. Extending across the top of each orifice is a "pouch pneumatic" C, formed of flexible material, as of leather, in the nature of a diaphragm capable of being vibrated by the pressure of the air and by the return action of a valve mechanism bearing thereagainst. For convenience of construction the said base may have secured thereupon a suitable strip or piece of leather, (indicated in Fig. 6 at C',) properly covering a series of said orifices, (indicated thereunder in said figure in dotted lines.)

$A^3$ and $A^4$ represent the two sides of the wind-chest constructed with a series of passages $a$, each communicating through suitable valve mechanism with the interior $A^5$ of the wind-chest and with a pipe D, located over the wind chest. The series of passages $a$ are located alternately on each side, preferably for convenience and economy of space, and lead to the series of pipes D, forming the set of pipes operated through the independent wind-chest.

E represents the valve mechanism controlling communication from the wind-chest through one of said passages leading to the pipe.

As shown more fully in Fig. 3, the valve mechanism is in the form of what is termed in the art a "square," consisting of bell-crank-lever arms $e\ e'$, provided with a valve $e^3$ at the lower extremity of the arm $e'$, closing the entrance end of the passage $a$.

E' is a butt engaged upon the side of the wind-chest and having a jointed engagement with the arms of the square, as shown at $e^4$. At the outer end of the arms $e$ is engaged a "sticker" $e^2$, the same extending downward through an orifice $a$ in the bottom board $A^6$ of the wind-chest. Said orifice at its lower end is enlarged, as shown at $a^2$, to correspond with the enlargement of the orifice $b$ in the base B, the two enlarged portions in conjunction forming a chamber in which the pneumatic C may vibrate. At the lower end the sticker rests upon the pneumatic. The wind-chest, with its base B, rests upon a channel-board F, which extends thereunder, preferably at right angles thereto. The channel-board is constructed with a series of channels F', each channel being provided with a series of orifices $f$, so located as to register with or conform to the orifices $b$ in the base of the wind-chest. The air-supply to each of said channels is controlled by a corresponding key $F^2$ on the manual, as hereinafter explained. The channel-board is preferably constructed in sections, a series of independent wind-chests being located transversely upon a series of independent channel-boards when the organ is set up, as many channel-boards being employed as are necessary to correspond with the wind-chests. Wind is supplied to the several channels through one end thereof in any suitable manner.

As illustrated in Fig. 1, the admission of wind to the channel-boards is as follows: G denotes a key-box filled with wind from the bellows.

G' is a groove or channel communicating with the key-box, as shown at $g$, and corresponding to a given key, as $F^2$. This communication is controlled by a valve $G^2$, operated by a sticker $g'$, in connection with the key on the manual.

H denotes a flapper-box communicating with the channel $G^2$, as through an opening $h$, controlled by a flapper-valve H'.

$H^2$ is a tube leading from the flapper-box to pneumatic I, suitably supported, as upon a support I'.

J is fresh-wind box forming the subject-matter of a separate application filed of even date herewith, said box communicating with the various channels F' of a set of channel-boards, as through an orifice $j$, controlled by a double-seated valve J', arranged to admit wind to the corresponding channel and to allow it to exhaust therefrom through an orifice $j'$. This valve is actuated by means of a pneumatic $J^2$. $J^3$ is a passage leading from the fresh-wind box to the pneumatic $J^2$, said passage controlled by a double vale $J^4$, the channels constructed to exhaust through an orifice $j^2$. The valve $J^4$ is actuated by the pneumatic I, above described. By this construction it will be seen that when a given key is pressed, as the key $F^2$, wind is admitted to the tube $H^2$, thence to the pneumatic I, lifting the valve $J^4$, allowing wind to pass from the fresh-wind box to the pneumatic $J^2$, lifting the valve J', and admitting air to the channel-board. We do not, however, in this present application limit ourselves to this precise mechanism for admitting wind to the channel-board. The independent wind-chests—one for each stop or set of pipes—are separately supplied with wind through one end thereof in any suitable manner. Thus, for example, in the center, between the two sections A' $A^2$, is located the stop-box K, communicating with the wind-chests, as at $z$, and provided with a suitable wind-trunk K', leading thereinto. The adjacent extremities of the sections A' $A^2$ of the independent wind-chest abut up against the stop-box, the entrance of wind into each of said extremities being controlled by a suitable valve $K^2$, operated by the stop-knob, the drawing of which opens the valve and admits the air into the ends of the sectional chest and therethrough to the corresponding set of pipes.

The drawing of the stop actuates said valve in the following manner: L denotes a valve-chamber supplied with wind, provided with an outlet-tube L' and an exhaust port $l$.

$L^2$ is a slide-valve governing the outlet and exhaust, said valve connected with the stop $L^3$ in any suitable manner, as by rods $l'\ l^2$ properly united. The tube L' leads to a pneumatic M. Within the wind-trunk K' is located a pneumatic M', connected with the valve $K^2$. The base $K^3$ of said wind-trunk is constructed or provided with a channel $k$, communicating with the interior of said trunk, as through a port $k'$, with the pneumatic M' and exhausting through a port $k^2$. The ports $k'$ and $k^2$ are controlled by a double-seated valve M², provided with a stem m, connected with the pneumatic M and extending through a guide-arm m'. The pneumatic M' is connected to the valve k² by means of a rod K⁴, extending upward through the stop-box and is provided with a loop k³, engaged with a spring N to seat the valve K². It is obvious that when the port k' is open air passes from the trunk into the pneumatic M' and inflates it, while at the same time the air within the trunk exerts the same pressure upon the outer surface of the pneumatic. The pressure within and without the pneumatic is therefore normally in equilibrium and the spring N seats the valve K², closing the communication from the trunk into the stop-box. It will also be seen that when wind is admitted into the pneumatic M the valve M² is lifted, closing the port k' and allowing the pneumatic M' to exhaust, as it will do, owing to the pressure from the air without. The pressure within being cut off, the collapse of the pneumatic M' will draw down the valve K², admitting air into the stop-box and communicating wind-chests. The stop-box is divided into separate compartments K⁵, corresponding to each wind-chest. The air-trunk beneath may be common to all. The wind in the various compartments K⁵ is permitted to exhaust through ports k⁵, the rod K⁴ being provided with a valve k⁶ to seat upon and close the ports k⁵ when the valve K² is opened, and vice versa.

N³ is the primary bellows supplying wind to the trunk K through a wind-pipe N'.

To allow the pneumatic I to exhaust, the upper wing thereof is constructed with an orifice. (Shown in dotted lines, Fig. 1, at i.) Located above said orifice is a washer i', preferably of felt, against which the orifice closes when the pneumatic is inflated. When the inflation ceases, the pneumatic drops away from said washer, leaving said orifice open. So, also, to permit the air to exhaust above the pouch pneumatic C a small orifice (shown at a³, Fig. 3) may lead from the chamber above said pneumatic to the exterior thereof. In order to insure the proper seating of the valves e³ they may be loosely attached to the corresponding lever-arm.

Instead of making each wind-chest separate and distinct, it is evident that a solid wind-chest might be partitioned off or divided into separate compartments, the separate compartments corresponding to the individual wind-chests heretofore described, and we would have it understood that we contemplate in the following claims and include in the term "an independent wind-chest" a chest having a separate air-compartment for a set of pipes or a part of a set, since a separate air-compartment may be employed to supply a part of a set of pipes when it may be desirable so to separate the pipes as to require more than a single air-chest to supply them.

What we claim as our invention is—

1. In a pipe-organ, an independent wind-chest for each set of pipes, controlled by a given stop, said wind-chest made in sections, substantially as described.

2. In a pipe-organ, an independent wind-chest for a set of pipes, controlled by a given stop, and a stop-actuated valve to admit air into said chest, substantially as described.

3. In a pipe-organ, an independent sectional wind-chest for a set of pipes, controlled by a given stop, and a stop-actuated valve to admit air into the sections of said chest, substantially as described.

4. In a pipe-organ, an independent wind-chest for each set of pipes, a valve to control communication of air from the chest to each pipe, a pneumatic to control said valve, and a channel-board to supply air to operate said pneumatic, substantially as described.

5. In a pipe-organ, an independent wind-chest for each set of pipes, a channel-board communicating with said wind-chest, valve mechanism controlling the admission of air from the wind-chest to the pipes, and valve mechanism to control admission of air to the channel-board, substantially as described.

6. In a pipe-organ, a series of independent wind-chests, each corresponding to a set of pipes, valves controlling the admission of air from said chests to the corresponding pipes, and a series of channel-boards to supply air to operate said valves, substantially as described.

7. In a pipe-organ, the combination, with an independent wind-chest, of a stop-box communicating therewith, an air-trunk communicating with said stop-box, and a valve to control the communication of the trunk with said box, substantially as described.

8. In a pipe-organ, the combination, with a stop-box, of an independent wind-chest for each set of pipes, and a valve to control the communication of said box with said chest, substantially as described.

9. In a pipe-organ, the combination, with an independent wind-chest for each set of pipes, constructed in sections, of a box communicating with said sections to admit air thereto, and a valve controlling the admission of air to said sections, substantially as described.

10. In a pipe-organ, the combination, with a series of wind-chests, of a stop-box provided with compartments corresponding to each wind-chest, an air-trunk communicating with each of said compartments, and valves to control said communication, substantially as described.

11. In a pipe-organ, an independent wind-chest for each set of pipes, a series of valves located upon opposite sides of the wind-chest and alternately arranged to govern the communication of air from the wind-chest to each of said pipes, said pipes arranged on opposite sides of said chest, substantially as described.

12. In a pipe-organ, an independent wind-chest for each set of pipes, provided with a base B, having in combination therewith a channel-board located beneath said base, valve mechanism for controlling the passage of air from said chest to each of said pipes, said base provided with a pneumatic to operate the valve mechanism and said channel-board constructed with an air-passage leading to said pneumatic, substantially as described.

In testimony whereof we sign this specification in the presence of two witnesses.

EDWIN S. VOTEY.
WILLIAM D. WOOD.

Witnesses:
N. S. WRIGHT,
JOHN F. MILLER.